Figure 1:
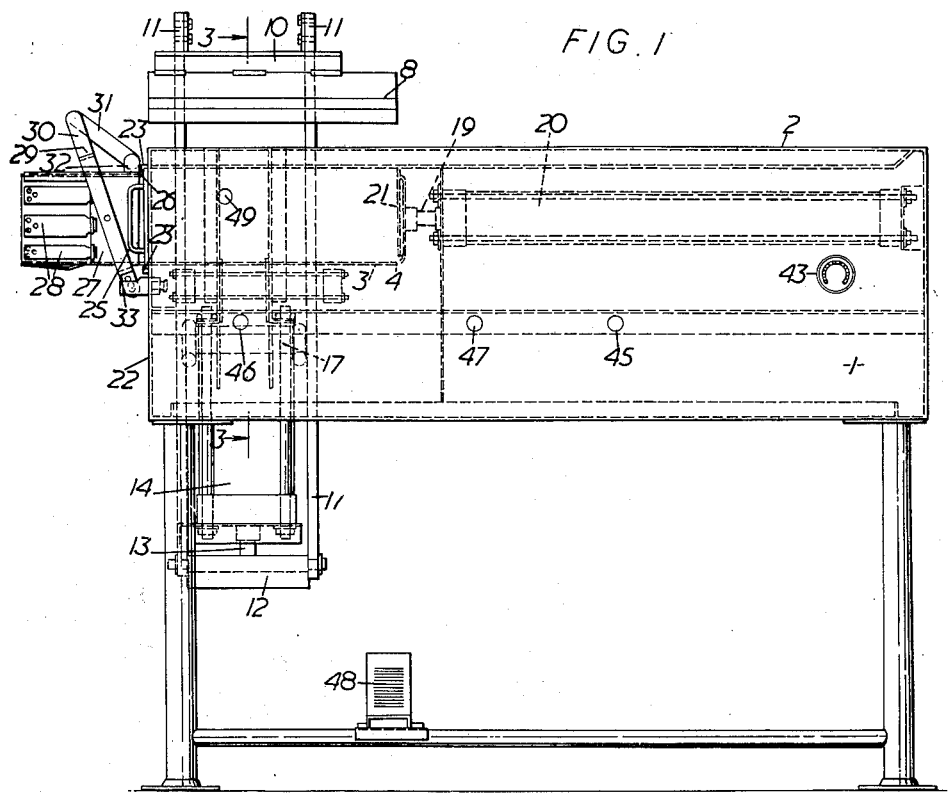

April 4, 1961 L. G. A. LEONARD ET AL 2,977,732
MEAT-STUFFING MACHINE
Filed Aug. 1, 1958 5 Sheets-Sheet 1

Inventors
Leslie G. A. Leonard
Clarence Smith
By
Paul G. Mullendore
Attorney

April 4, 1961    L. G. A. LEONARD ET AL    2,977,732
MEAT-STUFFING MACHINE
Filed Aug. 1, 1958    5 Sheets-Sheet 2
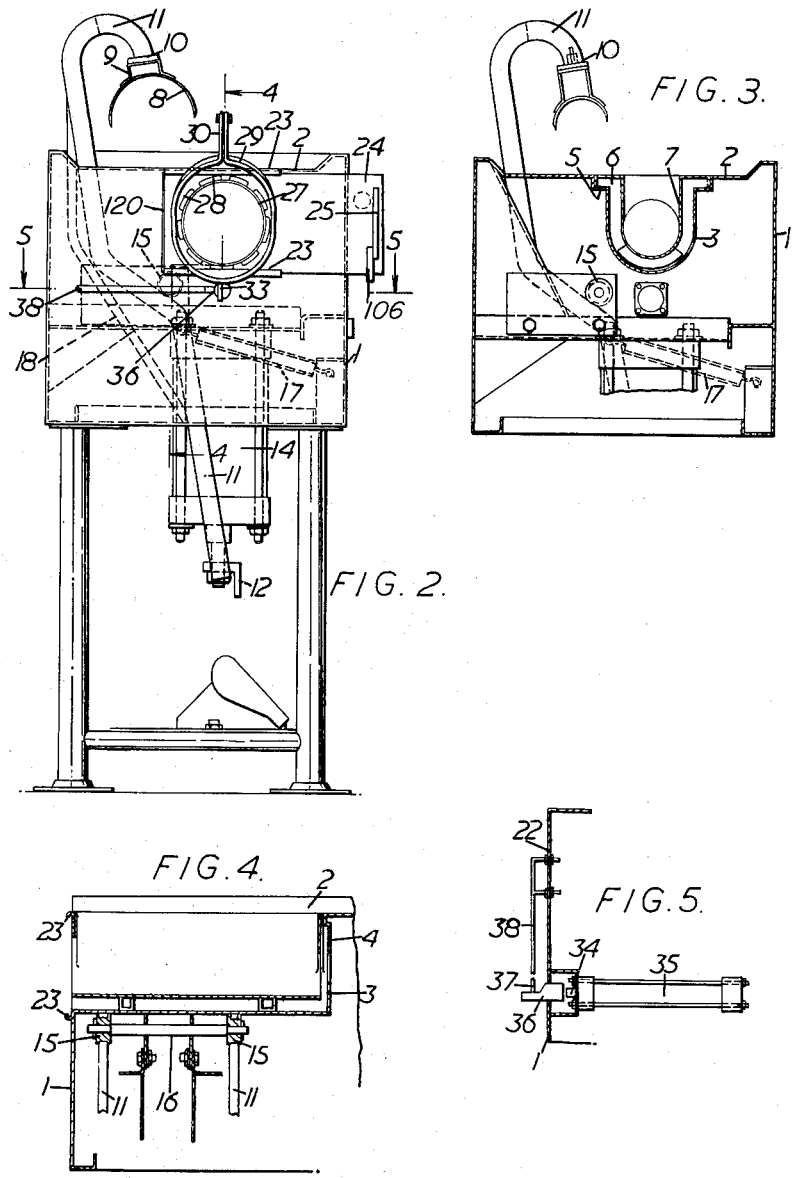
Inventors
Leslie G. A. Leonard
Clarence Smith
By
Attorney

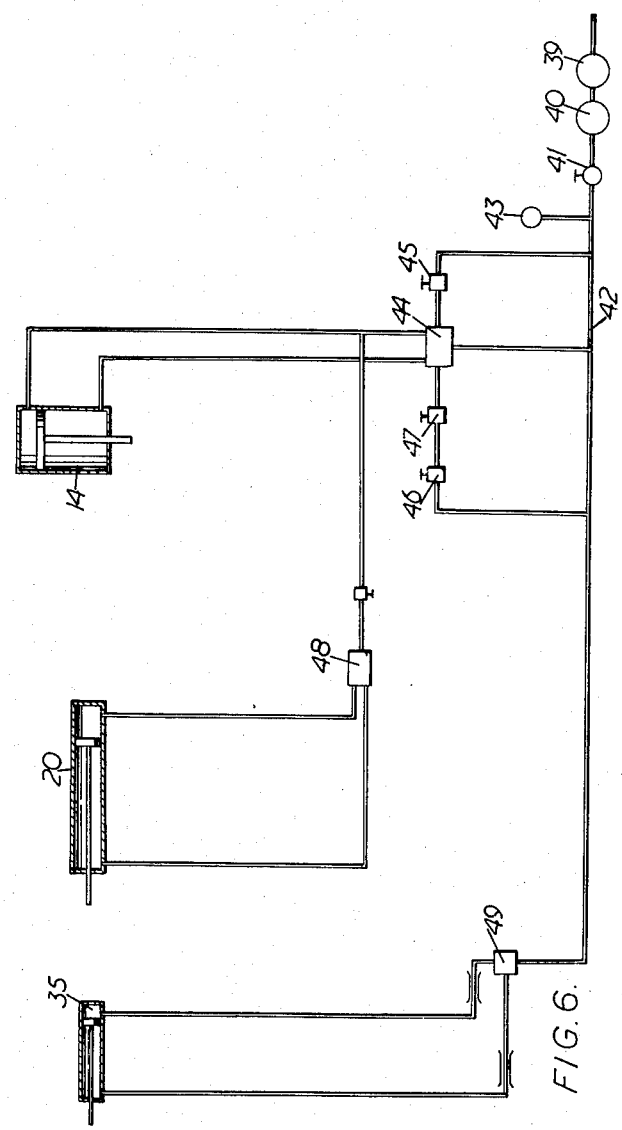

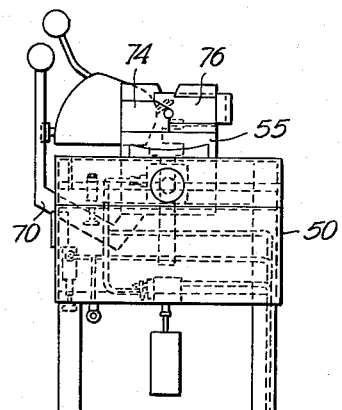
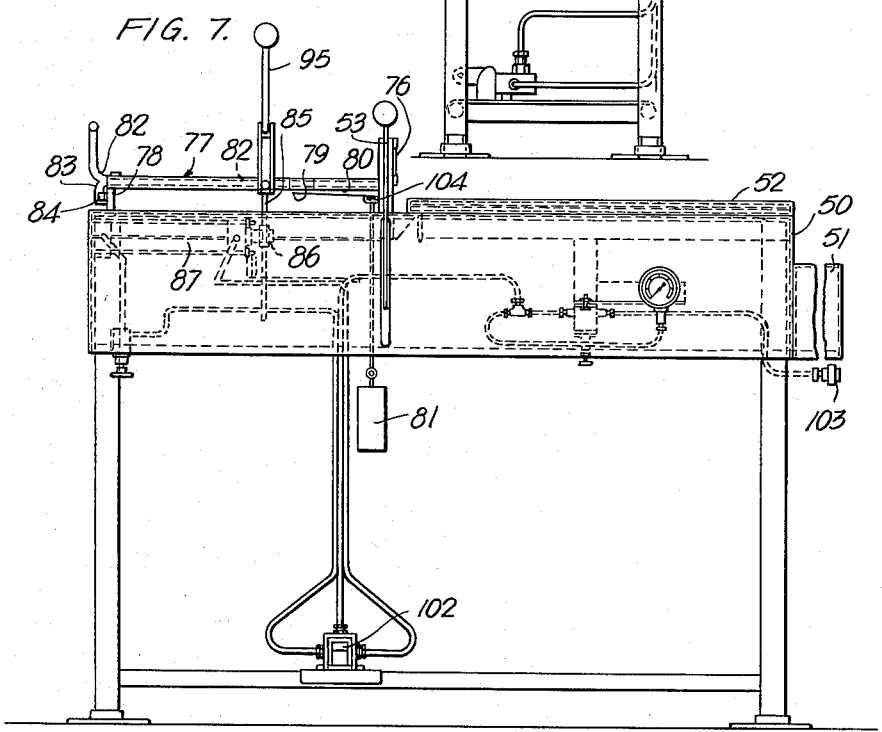
FIG. 8.
FIG. 7.
INVENTORS.
Leslie G. A. Leonard
Clarence Smith
BY
ATTORNEY.

April 4, 1961  L. G. A. LEONARD ET AL  2,977,732
MEAT-STUFFING MACHINE
Filed Aug. 1, 1958  5 Sheets-Sheet 5
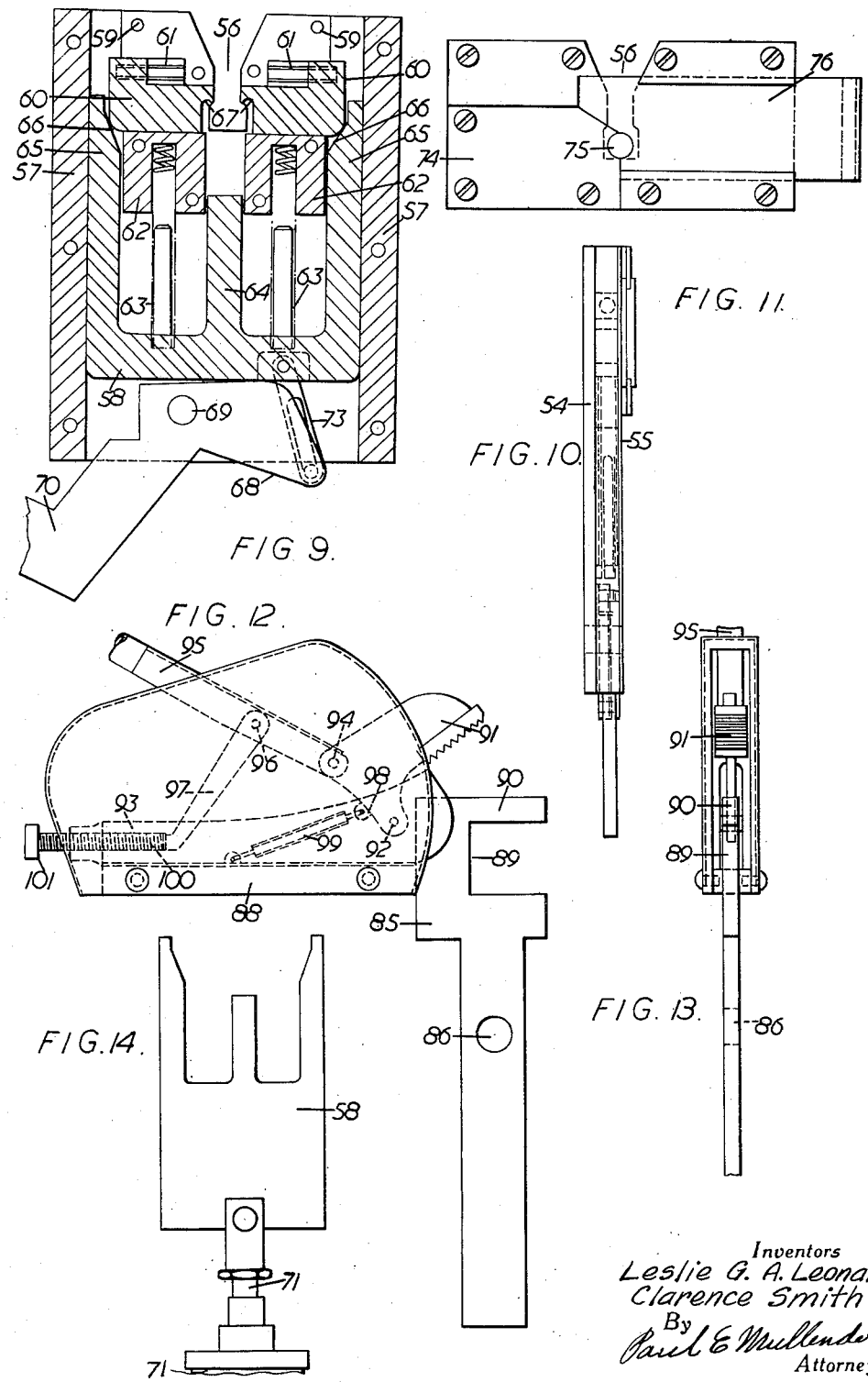
Inventors
Leslie G. A. Leonard
Clarence Smith
By
Paul E. Mullendore
Attorney

United States Patent Office 2,977,732
Patented Apr. 4, 1961

2,977,732

MEAT-STUFFING MACHINE

Leslie George Adye Leonard, Hazelgrove, Stockport, England, and Clarence Smith, Porto-Bello, Midlothian, Scotland, assignors to United Gas Industries Limited, London, England, a British company Filed Aug. 1, 1958, Ser. No. 752,667

Claims priority, application Great Britain Aug. 6, 1957

8 Claims. (Cl. 53—124)

This invention relates to machines for stuffing boneless meat, such as ham, bacon, with or without rind, or beef, in casings of fibrous or plastic material.

According to the invention the machine comprises a work table having a longitudinal trough of the cross-sectional shape required for the compressed meat and open at least at one end, a trough cover plate to complete the cross-sectional shape of the compressed meat and adapted for movement parallel to itself to the trough under pressure and therefrom to open the trough, a pressing plunger which is movable at least through the length of the trough and a cover plate for the open end of the trough and its cover plate and that is replaceable by a nozzle plate through which the compressed meat is ejected from the trough and into the casing that is engaged with the nozzle.

For closing the casing about the compressed meat the machine may comprise also a clipping device for applying to the casing end to be sealed a deformable U-shaped clip by means of die members movable in a housing that is slotted at the upper end to receive the gathered end of the casing, one die member being adapted to support a clip and to move it under pressure to embrace the casing end and at least one other die member being forced by the first member to move transversely to the path of the latter to a position over the end of the casing and to co-operate with the first die member in closing the clip about the casing end.

If one end of the casing is already closed, the other end may be closed by the clipping device after the casing has been drawn tightly about the compressed meat by a clamping or gripping device which may grip the extremity of the casing protruding from the slot of the housing of the clipping device and by increase of the distance between the two devices by movement of one of them.

The gripping device may comprise a fixed jaw, a pivoted jaw in the form of a lever, an operating lever pivoted to and adapted to open and close the pivoted jaw, a strut bearing the fulcrum of the operating lever and having its remote end adapted to pivot and a spring acting upon the pivoted jaw.

The trough, its cover plate, the plunger and the nozzle may be exchangeable for others for producing compressed meat of differing diameters or cross-sections. The table may be formed with seatings for flanges formed on the troughs of diameters smaller than that of the largest diameter or the latter trough may be formed in the table surface and may be prepared to receive the smaller troughs.

The clipping device may be provided with a magazine for a supply of the clips, which are fed singly into the path of the first die member under the action of a spring or of gravity.

The operation of the movable parts of the machine and the associated devices may be effected by hand lever mechanism. It is advantageous, however, to effect the operation of those parts that have to exert pressure by power means operating, for example, pneumatically or hydraulically. Such power operation renders it advisable to provide some safeguard for the safety of the hands of the operator. Thus, in the case of the trough cover plate, for example, the supply of compressed air to the operating cylinder may be controlled by two control valves operating in series and spaced apart sufficiently to require both hands for effecting the closure of the cover plate.

A common table may be provided for the machine and the two devices, but since the operation of compressing the meat can be carried out more quickly than the operation of clipping the end or ends of the casing, it may be that two or more sets of the devices may be required to secure satisfactory continuation of production of the cased meat.

In the accompanying drawings there is illustrated an example of construction of a machine and the associated devices.

Figure 1 is a side elevation of the meat casing machine.
Figure 2 is a corresponding end elevation.
Figure 3 is a section on the line 3—3 in Figure 1.
Figure 4 is a detail section on the line 4—4 of Figure 2.
Figure 5 is a detail section on the line 5—5 of Figure 2.
Figure 6 is a diagram of the compressed air supply and control.
Figure 7 is a side elevation of the two devices and the table supporting them.
Figure 8 is an end elevation corresponding to Figure 7.
Figure 9 is a detail view of the clipping device.
Figure 10 is a view at right angles to Figure 9.
Figure 11 is a detail view of the casing-locating slide of the clipping device.
Figure 12 is a detail view of the gripping device.
Figure 13 is a view at right angles to Figure 12.
Figure 14 is a detail view of the clip-supporting die member of the clipping device provided for operation by compressed air.

Referring to Figures 1 to 6 of the accompanying drawings, there is provided a table 1 with a stainless steel working surface 2. At the one end there is formed a deep longitudinal trough 3 the lower part of which is of semi-circular cross-section. The trough 3 is closed at the inner end 4. As shown in Figure 3 there are formed near the table surface at each side a seating or flange 5 on which are received the lateral flanges 6 of the exchangeable troughs, such as 7. The seatings or flanges may be formed alternatively as parts of the table surface, so that the trough 3 is also removable.

The trough cover plate 8 is of semi-circular cross-section and of stainless steel. It may be provided with strengthening transverse ribs. It is further provided with a channel-section supporting frame 9, the depth of the channel depending upon the diameter or cross-sectional form of the trough. The supporting frame 9 is adapted to be secured to a carrying plate 10 mounted at the extremities of two spaced supporting arms 11, which are curved above the carrying plate 10 and then extend downwardly through transverse slots in the table surface 2 and are pivoted at their lower ends to a cross-head 12 carried by the piston rod 13 of a compressed air cylinder 14, suitably supported in a fixed position in relation to the table 1. An intermediate part in the length of each arm 11 is inclined or angled with reference to the remaining parts of the arms, which may lie in substantially parallel planes. The inclined parts of the two arms 11 co-operate with corresponding rollers 15 carried by a horizontal spindle 16 of fixed position. The arms 11 are caused always to tend to maintain contact with the rollers 15 by action of tension springs 17 which are anchored at one end to the arms 11 beneath the inclined parts thereof, the outer ends of the springs 17 being anchored to fixed lugs or the like at the front of the table 1. The purpose of the particular formation of the arms is to ensure that, when the cover plate 8 is in the closed position on the trough 3, the curved parts of the arms clear the table surface 2 and the rollers 15 then bear upon the arms near to the upper ends of the inclined parts of the arms. The piston 13 is then extended outwardly and downwardly near to the limit of its stroke. When the cover plate 8 is lifted from the trough 3, the piston rod 13 moves inwardly and the arms 11 rise so that the rollers 15 impose a rearward movement of the arms 11 as they contact the inclined parts of the arms. This rearward movement continues until the rollers are near the lower ends of the inclined parts of the arms. The cover plate 8 is then well to the rear of the trough 3 and does not interfere in any way with the operation of charging the trough with a mass of meat. As the force exerted by the arms 11 in closing the trough is considerable, there is a tendency for the arms to be deformed or strained. This tendency is resisted in the particular construction by the provision of reinforcing arms 18 welded between the upper and lower ends of the arms 11. If weight is not of importance, the same result may be secured by forming the arms 11 of heavier cross-section or of greater depth from the front edge to the rear edge.

Through the closed end 4 of the trough 3, or through a fixed plate if the trough 3 is removable, there extends the piston rod 19 of a compressed air cylinder 20 serving for the purpose of compressing the meat in the trough and ejecting it from the trough. The extremity of the rod 19 is adapted to receive the plunger plate 21, or a plunger plate that is suited to the diameter or cross-sectional shape of the trough in use. It will be understood that the axis of each trough, when the trough is in the operative position, coincides with the axis of the piston rod 19.

The table 1 ends at the open end of the trough 3 in a vertical wall 22 in which is an opening to correspond with the open end of the trough of the largest cross-sectional area. Above and beneath the opening there are provided parallel horizontal slideways 23, in which is slidably received the trough closure plate 24 which, in this particular construction, serves also as the nozzle plate. The plate is rectangular in form and twice the width necessary for the closure of the open end of the trough. At the front end there is a handle 25, by which the plate is moved between its two limiting positions. When the plate is moved to the limit rearwardly the trough is closed. When the plate is drawn forward until a flange 120 at the rear edge contacts the slideways 23 the nozzle 26 is presented to the open end of the trough. Rearward movement of the plate is limited by a latch 106 adjacent the handle. Lifting of the latch permits the slide being withdrawn from the slideways. The nozzle is a sheet metal cylinder. It is enveloped by a slidably fitting cylindrical sleeve 27 at the outer end of which are hinged several, for example, eight, equally spaced longitudinally extending, transversely curved flaps 28, the outer ends of which are dimpled outwardly. Thus, when the sleeve 27 is moved along the cylinder 26 the flaps 28 are expanded along the wall of the cylinder. In order to effect the movements of the sleeve 27 on the cylinder 26 the sleeve has pivoted to it on a horizontal diameter a stirrup 29 which has a radial lug 30, linked by the bar 31 to a lug 32 fixed close to the plate 24 at the top of the cylinder 26. Diametrically opposite the lug 30 the stirrup bears a further radial lug 33, through which the movements of the sleeve are effected by the piston rod 34 of a compressed air cylinder 35 mounted in fixed position on the table 1 beneath the trough 3. Since the plate 24 has to move transversely to the axis of the cylinder 35, it is necessary to make provision for the movement of the lug 33 towards and away from the axis of the cylinder 35. Thus, the piston rod 34 has a head 36 that bears a horizontal pin 37 set parallel with the direction of movement of the plate 24. The pin 37 is adapted to engage an elongated radial slot in the lug 33. When the piston rod 34 is at the end of its in stroke the pin 37 registers with a guide rod 38 which extends horizontally along the wall 22, to which it is fixed at two positions at the rear end. Its forward end lies with only small clearance from the pin 37.

Referring in particular to Figures 1 and 6, the compressed air for effecting the operation of the machine is supplied by way of an air line valve 39 and a fog-lubricant device 40 to a control stop cock 41 and thence to a main line 42, with pressure gauge 43. The cylinder 14 for operating the trough cover plate 8 is served by way of a control device or relay valve 44 that is actuated through the push button valve 45 to lift the cover plate and through the series push button valves 46 and 47 to lower the cover plate and press the meat in the trough. The cylinder 20 is controlled by a two-position foot valve 48 which receives the supply from the line to the top of the cylinder 14, so that it may only be operated when the trough cover plate is in the closed position. The cylinder 35 receives its supply from the main line 42 by way of a push and pull valve 49, the lines to each end of the cylinder being provided with flow regulators.

The associated clipping and gripping devices are mounted upon a separate table 50 which has at the right hand end an extension 51 the surface of which is well beneath the level of the axis of the cylinder 35 and is adapted to butt with its end against the wall 22 of the table 1 under the nozzle 26. The table 50 is thus suitably positioned for the transfer of the cased meat from the nozzle 26. Immediately adjacent the extension 51 the table 50 bears a removable platform 52, of sheet metal and of a concave cross-section, upon which the meat rests. The elevation of the surface of the platform is such that the cased meat is well placed for the operation upon it of the clipping device 53. Thus, it is necessary to provide a platform adapted to each size of cased meat leaving the nozzle 26.

The clipping device has a housing formed by spaced parallel, substantially rectangular plates 54 and 55 having identical vertical slots 56 in the upper ends, for the admission of the free end of the casing of the meat after gathering. The plates 54 and 55 are spaced by front and rear bars 57 that form a slide for the clip-supporting die member 58 and may also serve for the securing of the device to the table by means of a transverse angle iron support beneath the table surface.

At the upper ends the plates 54 and 55 are spaced by angle blocks 59 which border the angular parts of the slot 56, define the upper surfaces of the slides for the two die members 60 and back the latter against the pressure exerted by the die member 58 and finally as housings for compression springs 61 that tend always to return the die members 60 to their inoperative positions. The slides for the die members 60 are completed beneath the members by rectangular blocks 62 which also space the plates 54 and 55, serve to assist in guiding the die member 58 in its movements and as housings for compression springs 63 which tend always to assist gravity to return the die member 58 to its inoperative position.

The die member 58 is in the form of a three-pronged fork. The middle limb 64, which is relatively short, is the operative part of the member and serves to support the U-shaped clip to be applied to the casing of the meat, the clip having its limbs directed upwardly. The outer limbs 65 extend upwardly to the level of the die members 60 and are there formed, on their inner faces, with inclined cam surfaces 66 which, in the upward movement of the member, force the die members 60 together against the action of the springs 61. The die members 60 are formed with under-cut operative surfaces 67 in the adjacent vertical faces which are pressed into contact under the action of the cam surfaces 66. These operative surfaces 67 serve to curl the limbs of the clip about the gathered end of the casing, under the pressure of the die member 58.

The upward or operative movements of the die member 58 may be effected by hand or by power. As illustrated particularly in Figure 9, a rotatable cam 68, pivoted at 69 on a horizontal axis, bears upon the lower face of the die member 59 and is provided with an operating arm or lever 70, which extends forwardly through a vertical slot in the front part of the skirt of the table 50. Alternatively, as illustrated in Figure 14, the die member 58 may be coupled to the piston rod 71 of a compressed air cylinder 72, which is double-acting and provided with a corresponding control device. With hand operation as illustrated in Figure 9 it is useful to link the cam 68 with the die member 58 by a pivoted link 73.

As illustrated in Figure 11, the plate 55 of the housing of the clipping device may be provided with means for locating the gathered end of the casing to be clipped. Thus, a fixed plate 74 having an inclined upper edge adjacent the slots 56 may be formed at the position which is to be occupied by the casing end with a substantially semi-circular recess 75. Co-operating with this plate 74 there is a second, slidable plate 76 that has a complementary formation at the edge that contacts the plate 74. By the two plates the gathered end of the casing is compressed into a compact form about which the limbs of the clip may be readily passed on the upward movement of the die member 58.

The clips are supplied to the die member 58 as required from a horizontally disposed magazine 77 the near end of which is fitted in an opening in the plate 54 and the outer end of which is supported on a pedestal 78. The magazine is of sheet metal and of a cross-section to take a succession of the clips with their limbs pointed upwardly. The follower is provided with a lug 79 that extends through a longitudinal slot in the bottom of the magazine and is coupled to a cord 80 which passes over a pulley 104 of fixed position and supports a weight 81. A guide rod 82 may extend longitudinally along the magazine and through the follower with clearance. It may be formed with a downwardly directed spur 83, which may constrain the guide rod in its operative position i.e. angularly about its length by engaging between two oppositely disposed spring catches 84 mounted on the outer face of the pedestal 78.

The casing gripping device, as illustrated more particularly in Figure 12, comprises a stout angled body 85 of which a vertically disposed limb extends through a longitudinal slot in the surface of the table 50 for connection at 86 to the piston rod of a double-acting compressed air cylinder 87 set horizontally in fixed position beneath the surface of the table. A second limb 88 of the body 85 extends transversely above the surface of the table. At the angle of the body there is formed a rectangular slot 89 which embraces with clearance the clip magazine 77. The upper surface of the upper limb or wall of the slot 89 forms one of the jaws 90 of the gripping device. The upper jaw 91 is a lever that is pivoted at 92 to a carrier 93 that extends along and in fixed relation to the limb 88. The jaw 91 is further pivoted at 94 to a hand lever 95 that has its fulcrum 96 at the outer end of a strut 97 the lower end of which may be pivoted to or bear upon the carrier 93. Between the pivotal points 92 and 94 there is connected at 98 a tension spring 99 that is anchored at its other end to the carrier 93. By suitable selection of the positions of the pivotal points 92, 94 and 98 and of the disposition of the strut 97 and of the anchorage point of the spring 99, it is possible to ensure that if the hand lever 95 is lifted it positively opens the jaws whereas it positively closes the jaws when depressed to its lowest position, in which it tends to remain until lifted. The lower end of the strut 97 may be of a ball shape and bear against the inner end of a compression spring 100, which lies along the carrier 93 and bears upon an abutment at the remote end. Instead of a ball end, the strut 97 may have at the lower end a pivoted fork the stem of which lies within the spring 100. The remote end of the spring 100 may bear upon an adjusting screw 101. A suitably shaped sheet metal cover encloses the pivots and the connected parts and is conveniently secured to the limb 88 of the body 85.

The operation of the cylinder 87 may be controlled by a two-way foot control device 102. It may receive compressed air from the air line supplying the casing machine, to which it may be coupled by a connector 103.

It is unimportant whether it is the gripping device or the clipping device that is moved by the cylinder 87 for the purpose of tightening the casing about the meat before the second clip is applied. If it is the clipping device to which movement is imparted then provision must be made for the support of the clip magazine wholly from the housing of the device.

In operating the casing machine and the associated clipping and gripping devices as hereinbefore describe, an open ended fibrous or plastic casing is prepared at one end by forming a cuff of several thicknesses by turning the end of the casing inside out. The closure plate 24 is drawn forward to position the nozzle in register with the trough and to engage the lug 33 of the stirrup 29 with the pin 37, so that by operation of the cylinder 35 the sleeve 27 may be moved outwardly to collapse the flaps 28. The cuff of the casing is then passed over the flaps and the cylinder 35 again operated to return the sleeve and thus expand the flaps to engage the casing. The plate 24 is then pushed to its rear position to place the closure part in line with the trough. The cover plate of the trough being in the open position, a mass of boneless meat is rolled upon the surface 2 of the table 1 and is placed in the trough. The cylinder 14 is then operated to lower the cover plate and to press the meat to shape in the trough. While the cover plate is still in the closed position the foot valve 48 is operated for a short period to compress the mass of meat longitudinally. The plate 24 is then drawn forward to position the nozzle and the casing attached to it in register with the trough. The foot valve 48 is again operated, this time for the carrying out of the full stroke of the plunger 21 to inject the compressed mass of meat into the casing. The cylinder 35 is then caused to move the sleeve 27 outwardly to collapse the flaps 28 and to permit the cased meat to be withdrawn. The foot valve 48 is released so that the plunger 21 is retracted and the cover plate of the trough is then raised.

The cased meat is now on the platform 52. One end of the casing is gathered and inserted in the slot 56 of the clipping device. The slide 76 is then closed to compact the gathered casing end. A clip is then applied by the operation of the die members. The slide 76 is withdrawn and the casing removed from the slot 56. The cased meat is then reversed in position for the sealing of the second end. Before applying the clip the gathered end of the casing is inserted, as before, in the slot 56 and the slide 76 closed. The jaws of the gripping device are opened by raising the hand lever 95. The foot valve 102 is then depressed to cause the cylinder 87 to move the gripping device near to the clipping device. The gathered end of the casing is engaged by the jaws on the depression of the hand lever 95. The foot valve 102 is then released and the cylinder 87 moves the gripping device away from the clipping device, thus tightening the casing about the meat. While the tension on the casing is maintained the clip is applied. The tension on the casing may then be relieved by depressing the foot valve 102, whereupon the jaws may be opened by lifting the hand lever 95 and the casing then released from the clipping device.

In the clipping device the position of the magazine in relation to the operative part of the die mmeber 58 may be such that when the die member is in its normal position of rest the magazine feeds a clip onto the middle limb 64. It is preferred, however, that the position of rest of the limb 64 shall be such that the upper or operative end masks the outlet from the magazine. Thus, a slight lifting of the hand lever 70 is required to release a clip from the magazine to the limb 64.

It will be understood that the compressed meat cased products of the casing machine may be sealed by means other than the clipping and gripping devices hereinbefore described and similarly that the said devices may be used to seal cased meat products prepared by means other than the casing machine the subject of this invention.

We claim:

1. A machine for stuffing boneless meat in casings, comprising a work table having a longitudinal meat trough for receiving the meat and open at least at one end, a complementary cover plate for the trough to press the meat into the required cross-sectional form, the cover plate being adapted for movement parallel to itself to the trough under pressure and therefrom to open the trough, a nozzle at the open end of the trough, a pressing plunger within the trough which is movable at least through the length of the trough to eject the meat through the nozzle, a sleeve on the nozzle carrying expandable hinged flaps for engaging an end of the casing to be charged within the compressed meat, and a piston-cylinder assembly coupled to the sleeve for moving it axially on the nozzle.

2. A machine according to claim 1, in which the table is formed with seatings for flanges of exchangeable troughs.

3. A machine according to claim 2, in which the trough of the largest cross-sectional area is fixed to the table, flanges on the trough serving as seatings for the flanges of troughs of smaller cross-sectional area.

4. A machine for stuffing boneless meat in casings, comprising a work table having a longitudinal meat trough for receiving the meat and open at least at one end, a complementary cover plate for the trough to press the meat into the required cross-sectional form, the cover plate being adapted for movement parallel to itself to the trough under pressure and therefrom to open the trough, upright parallel arms supporting the cover plate at their upper ends, operating means for depressing the arms to bring the cover plate into position over the trough, guide means associated with the arms for moving the cover plate when it is raised laterally of the trough, a nozzle at the open end of the trough, a pressing plunger within the trough which is movable at least through the length of the trough to eject the meat through the open end of the plate, a sleeve on the nozzle carrying expandable hinged flaps for engaging an end of the casing to be charged with the compressed meat, and operating means coupled to the sleeve for moving it axially on the nozzle.

5. A machine according to claim 4, in which the lower ends of the arms are pivoted to the operating means, and the guide means consist of angled portions of the arms held in engagement with fixed rollers by spring means.

6. A machine according to claim 4, in which the operating means for the arms comprises a pneumatic piston-cylinder device.

7. A machine according to claim 6, in which the air line for operating the piston-cylinder device incorporates two spaced control valves arranged in series.

8. A machine for stuffing boneless meat in casings comprising a worktable having a longitudinal trough for receiving the meat and open at least at one end, a complementary cover plate for the trough to press the meat into the required cross-sectional form, the cover plate being adapted for movement parallel to itself to the trough under pressure and therefrom to open the trough, a nozzle at the open end of the trough, a pressing plunger within the trough which is movable at least through the length of the trough to eject the meat through the nozzle, a sleeve on the nozzle carrying expandable hinged flaps for engaging an end of the casing to be charged with the compressed meat, and a piston-cylinder assembly coupled to the sleeve for moving it axially on the nozzle, and a clipping device for sealing the gathered end of the casing.

References Cited in the file of this patent

UNITED STATES PATENTS

| | | |
|---|---|---|
| 1,493,075 | Hirschorn | May 6, 1924 |
| 2,698,500 | Clegg | Jan. 4, 1955 |
| 2,705,100 | Paxton | Mar. 29, 1955 |
| 2,733,564 | Russell | Feb. 7, 1956 |
| 2,795,092 | Rabinowirtz | June 11, 1957 |
| 2,847,808 | Romine | Aug. 19, 1958 |